(12) United States Patent
Braun

(10) Patent No.: US 12,646,908 B2
(45) Date of Patent: Jun. 2, 2026

(54) RECEIVING AND SECURING DEVICE

(71) Applicant: Friedrich Lütze GmbH,
Weinstadt-Grossheppach (DE)

(72) Inventor: Reinhard Braun, Winterbach (DE)

(73) Assignee: FRIEDRICH LÜTZE GMBH,
Weinstadt-Grossheppach (DE)

( * ) Notice: Subject to any disclaimer, the term of this
patent is extended or adjusted under 35
U.S.C. 154(b) by 223 days.

(21) Appl. No.: 18/694,538

(22) PCT Filed: Sep. 7, 2022

(86) PCT No.: PCT/EP2022/074802
§ 371 (c)(1),
(2) Date: Mar. 22, 2024

(87) PCT Pub. No.: WO2023/046469
PCT Pub. Date: Mar. 30, 2023

(65) Prior Publication Data
US 2025/0007252 A1 Jan. 2, 2025

(30) Foreign Application Priority Data

Sep. 24, 2021 (DE) ..................... 10 2021 004 837.7

(51) Int. Cl.
*H02B 1/32* (2006.01)
*H01R 13/506* (2006.01)
(Continued)

(52) U.S. Cl.
CPC .............. *H02B 1/32* (2013.01); *H01R 13/506*
(2013.01); *H01R 13/516* (2013.01); *H01R*
*13/5213* (2013.01)

(58) Field of Classification Search
CPC ................ H01R 13/506; H01R 13/516; H01R
13/5213; H01R 13/746; H01R 24/64;
H02B 1/32
See application file for complete search history.

(56) References Cited

U.S. PATENT DOCUMENTS 3,740,113 A * 6/1973 Cass ...................... G02B 6/032
385/125
6,351,592 B1 * 2/2002 Ehn ..................... G02B 6/44775
174/541
(Continued)

FOREIGN PATENT DOCUMENTS

DE 2 012 100 9/1970
DE 20121000 U1 * 3/2002 .......... H01R 13/746
DE 112005000164 T5 12/2006 ............ H01R 13/52

OTHER PUBLICATIONS

Search report for International Application No. PCT/EP2022/
074802, 4 pages.
German Office Action, Application No. 102021004837.7, 17 pages.

*Primary Examiner* — Timothy J Thompson
*Assistant Examiner* — Rhadames Alonzo Miller
(74) *Attorney, Agent, or Firm* — Slayden Grubert Beard
PLLC

(57) ABSTRACT

Disclosed is a receiving and securing device for keystone
modules, consisting of at least two components which are
releasably connected to each other and which delimit a
securing gap therebetween, of which the free gap space can
be modified by an advancing movement of the second
component towards the first component, and at least the first
component, around which the second component engages,
delimits a free opening space with a securing option for the
latching engagement of a keystone module that can be
inserted into the opening space.

16 Claims, 4 Drawing Sheets

(51) Int. Cl.
    H01R 13/516     (2006.01)
    H01R 13/52     (2006.01)

(56)           References Cited

U.S. PATENT DOCUMENTS

| | | | |
|---|---|---|---|
| 2005/0153591 A1 | 7/2005 | Milner et al. | 439/321 |
| 2007/0012474 A1* | 1/2007 | McNutt | H01R 13/5219 |
| | | | 174/135 |
| 2007/0036489 A1* | 2/2007 | Grzegorzewska | G02B 6/4292 |
| | | | 385/86 |
| 2009/0163058 A1* | 6/2009 | Craig | H01R 13/447 |
| | | | 439/147 |
| 2009/0255703 A1 | 10/2009 | Vigorito et al. | 174/67 |

* cited by examiner

RECEIVING AND SECURING DEVICE

CROSS-REFERENCE TO RELATED APPLICATIONS

This application claims priority to German Patent Application No. DE 10 2021 004 837.7, filed on Sep. 24, 2021 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to a receiving and securing device for keystone modules.

According to a German Wikipedia entry, a so-called keystone module is a modular connection system for standardised plug-in connectors for electrical or optical signal transmission, as used in network installations, laboratories, workshops or in the field of home entertainment. Unlike conventional connecting elements for cables (patch panels), the passive components are available separately from the chassis-like receiving and securing devices in the form of the keystone modules and are not permanently fitted together.

The keystone concept is particularly suitable for mixed cabling which is intended to combine many different signal transmissions neatly onto one patch panel, as can be encountered in the wiring of modern residential buildings, with ports for LAN, telephones, cable television, etc. Keystone is a standard that is installed by numerous manufacturers, with individual designs being subject to wide variability. Despite this, as a rule, keystone modules and chassis from all manufacturers, which are specially designed to receive said modules, can generally be combined together freely and in any manner. U.S. Pat. No. 5,624,274 describes the associated conformity of modules and chassis in the field of plug-in telephone connectors.

SUMMARY

Based on this prior art, a need exists to create an improved receiving and securing device for keystone modules. The need is addressed by the subject matter of the independent claim(s). Embodiments of the invention are described in the dependent claims, the following description, and the drawings.

DESCRIPTION

Figures 1, 2:
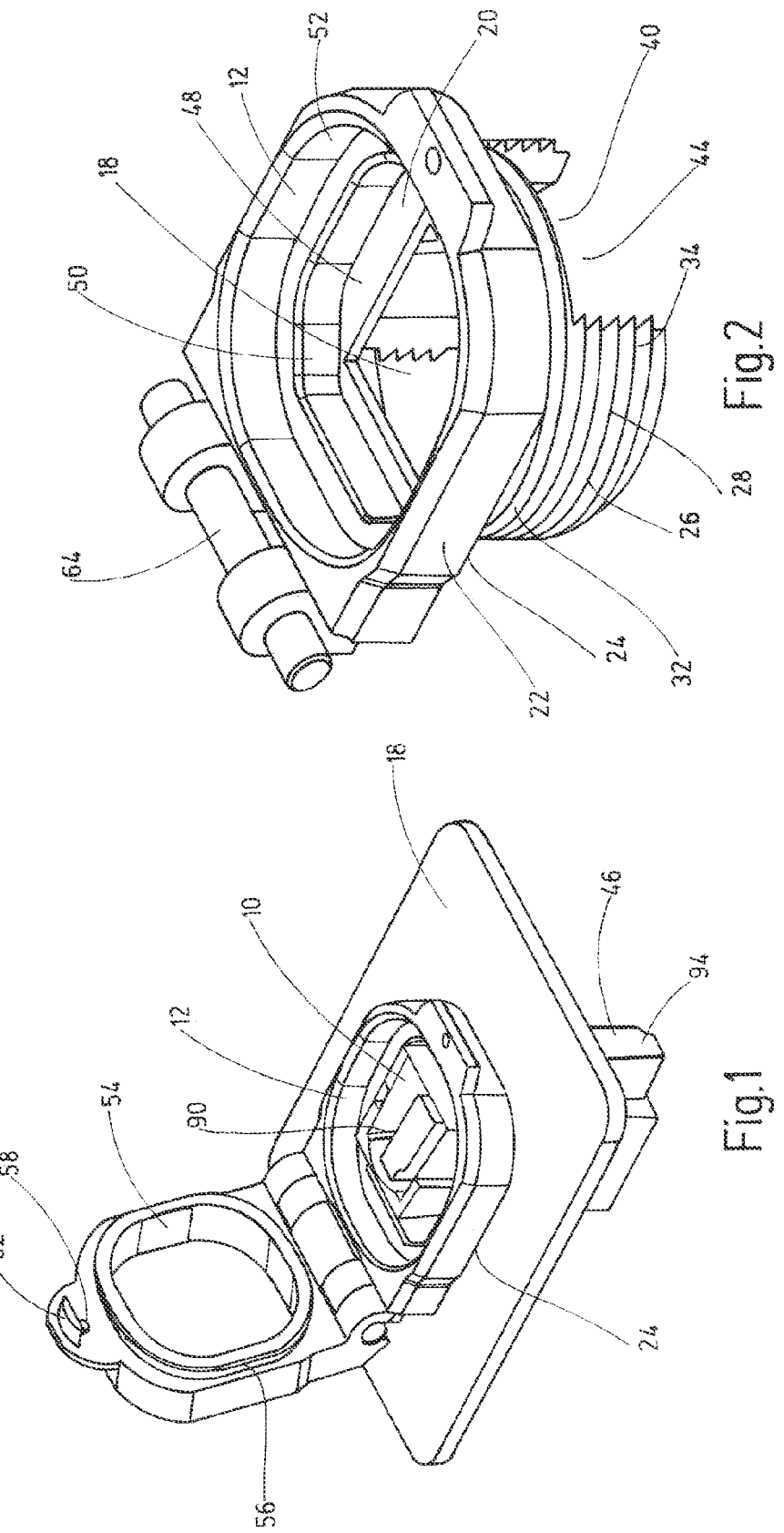
FIG. 1 is a perspective plan view of an example receiving and securing device with a keystone module inserted.
FIG. 2 shows a first component of the device according to FIG. 1, also in a perspective plan view with an example opening space released by the keystone module.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a receiving and securing device having the features described in the claims is provided. By virtue of the device consisting of at least two components which are releasably connected to each other and which delimit a securing gap therebetween, of which the free gap space can be modified by an advancing movement of the second component towards the first component, and at least the first component, around which the second component engages, delimits a free opening space with a securing option for the latching engagement of a keystone module that can be inserted into the opening space, a modular system is created, having one base unit, substantially consisting of the two components, into which as many different types of keystone modules as possible can be interchangeably inserted. With regard to the two-component structure of the receiving and securing device, the 5 solution according to the teachings herein is no longer restricted to use in building technology, where flush-mounted sockets are often used as supports for the use of keystone modules; rather, the latest solution design can be used for almost all types of electrical, electronic and, in some cases, optical connection technology in the industrial field.

In some embodiments, it is provided that the free opening space of the first component is constructed from different subcomponents thereof, having a first subcomponent that comprises a contact surface as part of the securing gap on its side facing the second component, and having a second subcomponent that has a threaded area on its outer side. The first component can be inserted in situ, by means of the contact surface, into an opening, for example into a wall opening of an industrial component, such as a control cabinet, the specified contact surface coming into supporting contact with the wall parts surrounding the wall opening. From the other side of the industrial component, the second component is then placed on the first component and secured to said component, the clamping or securing gap in which the components of the industrial component usually engage in the form of wall components narrowing such that, in this manner, the receiving and securing device in its entirety is secured to the industrial component in a stationary manner. The free opening space in the first component of the device secured in this manner then serves to receive a predefinable keystone module which is selected as required from a large number of such modules.

To ensure that the device is secured safely to the aforementioned industrial component, such as a control cabinet, it is for example provided that a third subcomponent is arranged between the first and second subcomponent, said third component, for example being thread-free, corresponding, in terms of its longitudinal extension, to the gap dimension of the securing gap. It is generally provided that the gap dimension corresponds to the wall thickness of the industrial component, the associated wall comprising the opening through which the device and the inserted keystone module pass.

The respective receiving and securing device can first be secured to the industrial component by retrofitting and then, according to the tasks to be performed subsequently, the keystone module can be retrospectively fitted in the corresponding device; however, it is also possible to fit the device, together with the keystone module, to the industrial component at the outset as part of the initial equipment process.

It Is for example provided that all subcomponents are an integral part of the first component such that, in this respect, the first component can also be manufactured from an injection moulded or diecast part using plastics materials.

In some embodiments, it is provided that the threaded area of the second subcomponent is subdivided into one area part that is designed to have a closed circumference, said part being adjacent to the contact surface of one subcomponent, and into a second adjoining area part that is designed with interruptions, and that, in the region of each interruption, the opening space opens into the surrounding area. For example, in this case it is provided that the interruptions of the second area part, formed as a diametrically opposite pair in relation to the longitudinal axis of the opening space, delimit a receiving space, which transitions into the opening space and serves to receive parts of the keystone module. By virtue of the receiving space that is also formed between the opening space and the surrounding area, it is also possible to receive even angular keystone modules in the device in a space-saving manner. Furthermore, this thus increases the degrees of freedom of a possible cable run leading from the keystone module towards an electrical or electronic supply circuit, as is generally found in control cabinets with corresponding wiring logic.

In some embodiments, it is provided that, in the region of the transition between the first and second area part, for example recessed in the direction of the first area part, a securing plate runs transverse to the longitudinal axis of the opening space as a securing option, said plate for example having a rectangular cross-section opening as part of the opening space. The corresponding securing plate can be brought into engagement with a correspondingly flexible latch of the keystone module such that the keystone module can be permanently secured in the device.

In some embodiments, it is provided that a cylindrical section of the opening space adjoins the rectangular opening cross-section of the securing plate in the direction of the threaded area and, on the opposite side, the opening space is extended in steps, that a first step is in this case surrounded by a polygon and a second adjoining step consists of a frame with an enlarged cross-section in relation thereto, with arcuate corner regions, which forms part of the first component. By virtue of the cylindrical section, the received keystone module, when inserted, can be safely protected from external influences and the gradual extension at the opposite end of the device improves handling, i.e., the keystone module can be inserted into the device in real time and secured there, either by hand or by means of corresponding actuating tools.

In some embodiments, it is provided that the first component comprises a pivotable cover part, which, in the closed state, covers the opening space on the side of one subcomponent, for example in sealed form by means of a sealing means, and, in the opened state, releases said opening space. In the closed state, the corresponding foldable cover part protects the opening space of the device and, in some cases, the received keystone module from humidity and dust from the surrounding area. It is for example provided that the cover part can be latched in an open position with respect to the first component so that connecting cables can easily be inserted into or removed from the received keystone module. As the cover part can be closed by hand without any additional application of force by a compression spring or similar, metal parts are thus also avoided in this region, such that contact problems are unable to arise inadvertently when connecting the keystone module in this region to cables transmitting power or information.

In some embodiments, it is provided that the cover part comprises a security opening, which, in the closed state, can be aligned with a further security opening on the side of the first component to attach a security device, such as a seal. By virtue of the fact that, in the closed state, the cover can be sealed, unauthorised access is prevented and, furthermore, a label can also be attached to the device by means of the seal. Independently, an additional labelling option can also be provided in the cover part, for example using white label tags for this purpose, which allow the device to be labelled individually by means of a standard plotter.

It has proved to be beneficial if the second component consists of an annular body, which is furnished with a thread on its inside, said thread allowing the second component to be screwed onto the threaded area of the first component, reducing the gap size of the securing gap. For example, it is further provided in this case that the second component comprises engagement surfaces on its outer circumference for engaging an actuating tool. For example, the annular body may have an external hexagon on its outside, which serves as an engagement surface for a suitable actuating tool such as a spanner.

Overall, this thus leads to a simple assembly without the need to use special tools for this purpose. The device can readily be secured to wall openings of walls with a wall thickness of up to 5 mm so that it is also possible to use the device with thick plastic or zinc diecast housings. Such housings often form control cabinets in the industrial field; the device can, however, be used in any location where keystone module technology can feasibly be used.

Practical tests have shown that the device can allow installation depths of 35 mm, particularly by using angled keystone modules. This is not possible with conventional systems that have installation depths in the region of approximately 70 mm. Accordingly, due to the short installation depth, the system can also be used as part of so-called slim designs, for example in connection with control panels.

In some embodiments, a system is provided consisting of the aforementioned device and a correspondingly suitable keystone module, which is standardised, at least in relation to its outer dimensions, for engaging in the opening space and in relation to the latching engagement on the securing option of the device, usually in the form of the fixing plate, via at least one latching lug.

In some embodiments, a control cabinet for receiving electrical and electronic components is provided, having at least one device or a complete system as described above, wherein the device can in each case be inserted in an insertion opening of an associated cabinet wall in an interchangeable manner such that the wall parts delimiting the insertion opening at least partially engage in the securing gap between the two components and are secured here in a clamping manner by means of the advancing movement of the two components towards one another.

In some embodiments, a connection system for a corresponding control cabinet is provided, consisting of a device or a system secured in the insertion opening of the cabinet wall, said device having a standardised keystone module, which, inserted in the free opening space of the first component via the securing option thereof, is latched, for example releasably, and in that the keystone module, at least partially released from the respective component, comprises a connection socket pointing to the surrounding area and wiring directed towards the inside of the control cabinet, which is connected to the electrical and/or electronic components of the control cabinet.

Corresponding control cabinets are known by the proprietor of the property right, for example via DE 10 2007 034 600 B3. Corresponding control cabinets are generally characterised in that they contain a device for arranging and securing electrical units and, with the device or system, respectively, according to the teachings herein, this provides an opportunity to transmit states of corresponding electrical units to diagnostic systems which can be connected via sockets from outside to the keystone module incorporated in a control cabinet wall via the receiving and securing device.

In addition to diagnostics of this kind, it is also or alternatively possible to influence electrical and electronic components inside the control cabinet via the interface from the outside, i.e., externally, as part of a service operation.

The solution according to the teachings herein is explained in greater detail below with the aid of an embodiment with reference to the drawings, which are in outline and not to scale.

Specific references to components, process steps, and other elements are not intended to be limiting. Further, it is understood that like parts bear the same or similar reference numerals when referring to alternate FIGS.

The receiving and securing device according to FIG. 1 comprises a received plug-in part, which is also referred to, in technical jargon in this context, as a keystone module 10. The device substantially consists of two components 12, 14, connected together in a releasable manner, and delimiting therebetween a securing gap 16 as shown on FIGS. 3 and 4, the free gap space of which can be varied by an advancing movement of the second component 14 towards the first component 12. According to the illustration on FIGS. 3 and 4, for the sake of clarity, the second component 14 is not yet completely advanced towards the first component 12, with the result that an extended distance arises between the two components 12, 14, which can be regarded as a preset for the actual securing or clamping position.

Figure 3:
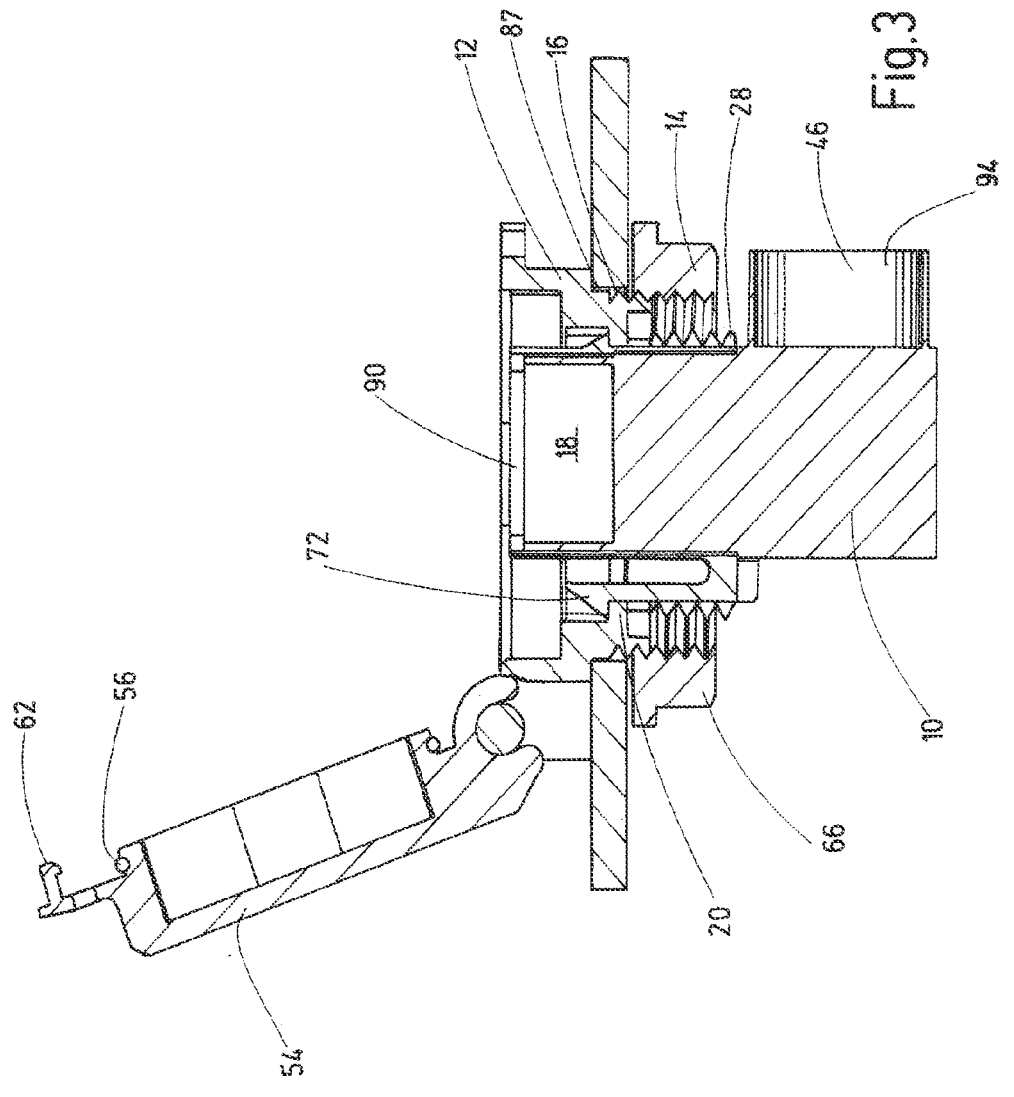
FIGS. 3 and 4 show a longitudinal section through the object according to FIG. 1, in one case with the cover part open and in the other case with the cover part closed.
Figure 4:
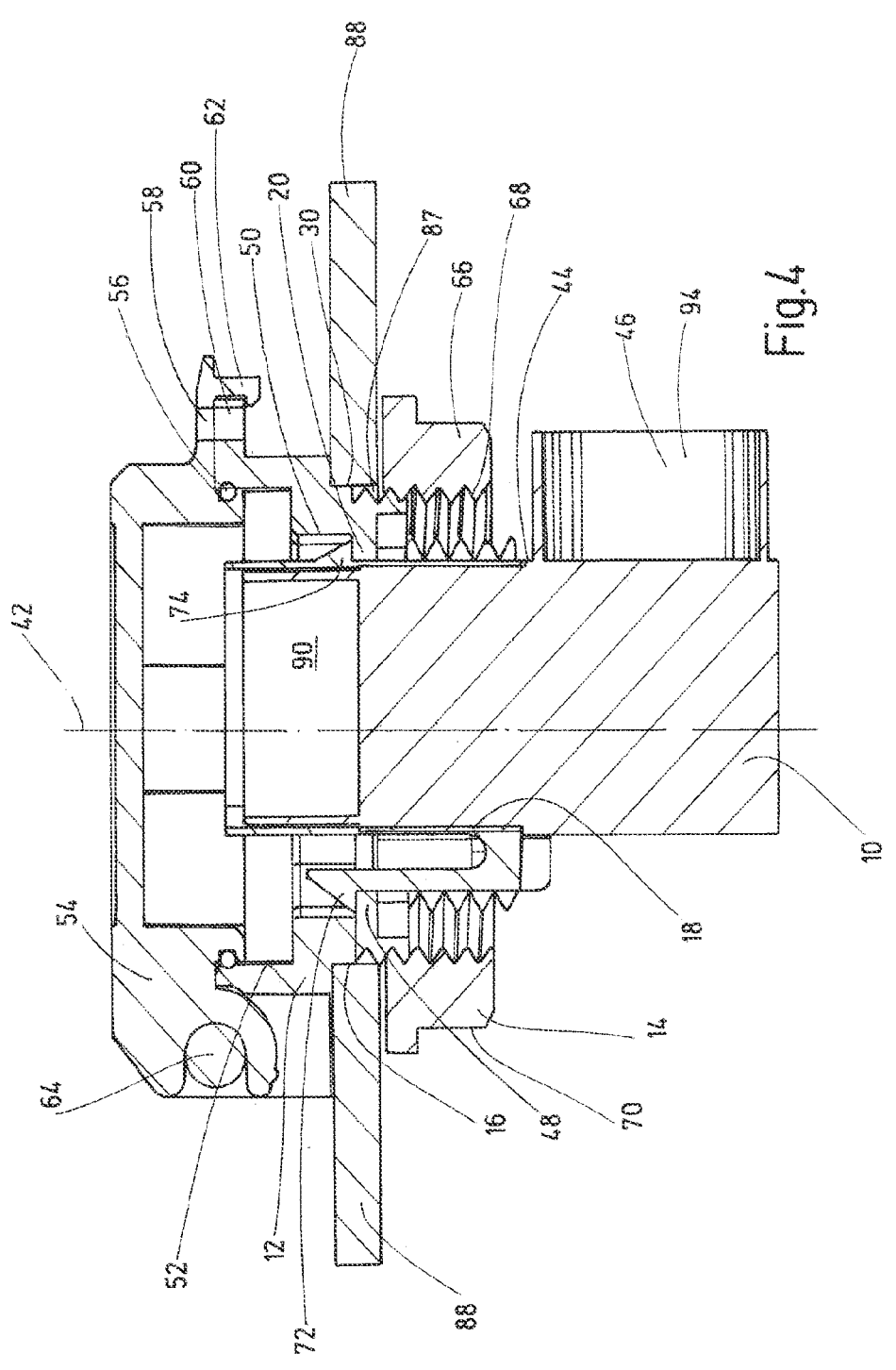

As is also shown on FIGS. 3 and 4, the first component 12, around which the second component 14 engages, delimits a free opening space 18 with a securing option 20 running therein for latching engagement of the keystone module 10 inserted in the opening space 18.

As is shown in FIG. 2 in particular, the free opening space 18 of the first component 12 is constructed from different subcomponents of said component with a first subcomponent 22 that comprises, on its side facing the second component 14, a contact surface 24 as part of the securing gap 16. A second subcomponent 26 is also provided, which has a threaded area 28 on its outer side. As is again shown on FIGS. 3 and 4, a third subcomponent 30 is provided between the first 22 and second subcomponent 26, said third component, which, for example designed thread-free, corresponding or substantially corresponding, in terms of its longitudinal extension, to the gap dimension of the securing gap 16. As such, all subcomponents 22, 26 and 30 form an integral part of the first component 12. The threaded area 28 of the second subcomponent 26 is subdivided into one area part 32 that is designed to have a closed circumference, said part being adjacent to the contact surface 24 of one subcomponent 22, and, adjacent thereto, there is an area part 34 that is designed with interruptions, which has been omitted from FIGS. 3 and 4 for the sake of simplicity. The free opening space 18 covered in this manner by the threaded area 28 opens into the surrounding area in the region of each interruption 40. The interruptions 40 in the second area part 34 are designed in pairs as shown on FIG. 2 and are positioned diametrically opposite one another with respect to the longitudinal axis 42 of the opening space 18.

In this manner, the slot-formed interruptions 40 each delimit a receiving space 44, which transitions into the central opening space 18 and serves to receive angular parts 46 of the keystone module 10.

In the region of the transition between the first 32 and second area part 34, for example recessed in the direction of the first area part 32, a securing plate 48 runs transverse to the longitudinal axis 42 of the opening space 18 as a securing option 20. The corresponding securing plate 48 has a rectangular opening cross section, as is shown in FIG. 2 in particular, as part of the opening space 18. A cylindrical section of the opening space 18 adjoins this rectangular opening cross-section of the securing plate 48, viewed as shown on the FIGS., towards the bottom, in the direction of the threaded area 28 and, on the opposite side, the opening space 18 is extended in steps, wherein a first step 50 consists of a polygon and a second adjoining step 52 is formed by a frame with an enlarged cross-section in relation thereto, with arcuate corner regions, as part of the first securing component 12.

As is also shown on FIGS. 1, 2 and 3, the first component 12 comprises a pivotable cover part 54, which, in the closed state (FIG. 4), covers the opening space 18 on the side of one subcomponent 22 and releases said space (FIG. 3) in the open state. The cover part 54 comprises, on its underside, a sealing means 56 arranged around a protrusion, said sealing means, which is designed as an O-ring, sealing the opening space 18 along with the received keystone module 10 with respect to the surrounding area when the cover part 54 is in the closed state. The cover part 54 comprises a security opening 58 on a protruding lug, said opening, when the cover part 54 is in the closed state (FIG. 4), being able to be aligned with a further security opening 60 on the side of the first subcomponent 22. A security device, such as a seal (not shown), can be attached in this manner. If the two security openings 58, 60 are aligned with one another, as shown on FIG. 4, their longitudinal axes coincide with one another.

Furthermore, a latching hook 62 can be attached to the protruding lug of the cover part 54 with the security opening 58, said hook coming into latching engagement from beneath with a corresponding protrusion on the subcomponent 22 of the first component 12 in a releasable manner when the cover part 54 is in the closed state. In the corresponding closed and latched state, the O-ring-shaped sealing means 56 comes into contact with the inside of the second step 52 of the first component 12. A pivot pin serves as a pivot axis 64, said pin running integrally along a projection on the first component 12, on which the cover part 54 can be placed with correspondingly arcuate mounts and latched with the pivot pin to permit a pivoting movement in the outlined frame.

As is also shown on FIGS. 3 and 4, the second component 14 comprises an annular body 66, which is furnished with a female thread 68 on its inside, which allows the second component 14 to be screwed onto the threaded area 28 of the first component 12, reducing the gap size of the securing gap 16. The annular body 66 of the second component 14 also comprises engagement surfaces 70 on its outer circumference, for example in the form of a hexagon, for engaging an actuating tool, which is not shown in greater detail, such as a corresponding spanner, with which the second component 14 can be screwed onto the first component 12 in a force-locking manner and also unscrewed again if necessary.

As such, the device is used to receive a standardised special keystone module 10, which must thus be a standardised plug-in connection part such that it is suitable, at least in terms of its external dimensions, for engaging in the opening space 18 of the first component 12. Furthermore, the keystone module 10 must comprise a latching lug 72, which, arranged on a stirrup-like extension of the keystone module housing, opens an overhang for hooking onto the securing plate 48 as part of the securing option 20. Correspondingly further latching lugs 74 for a securing operation on the securing plate 48 may be arranged on the outer circumference of the keystone module housing as required.

Figure 5:
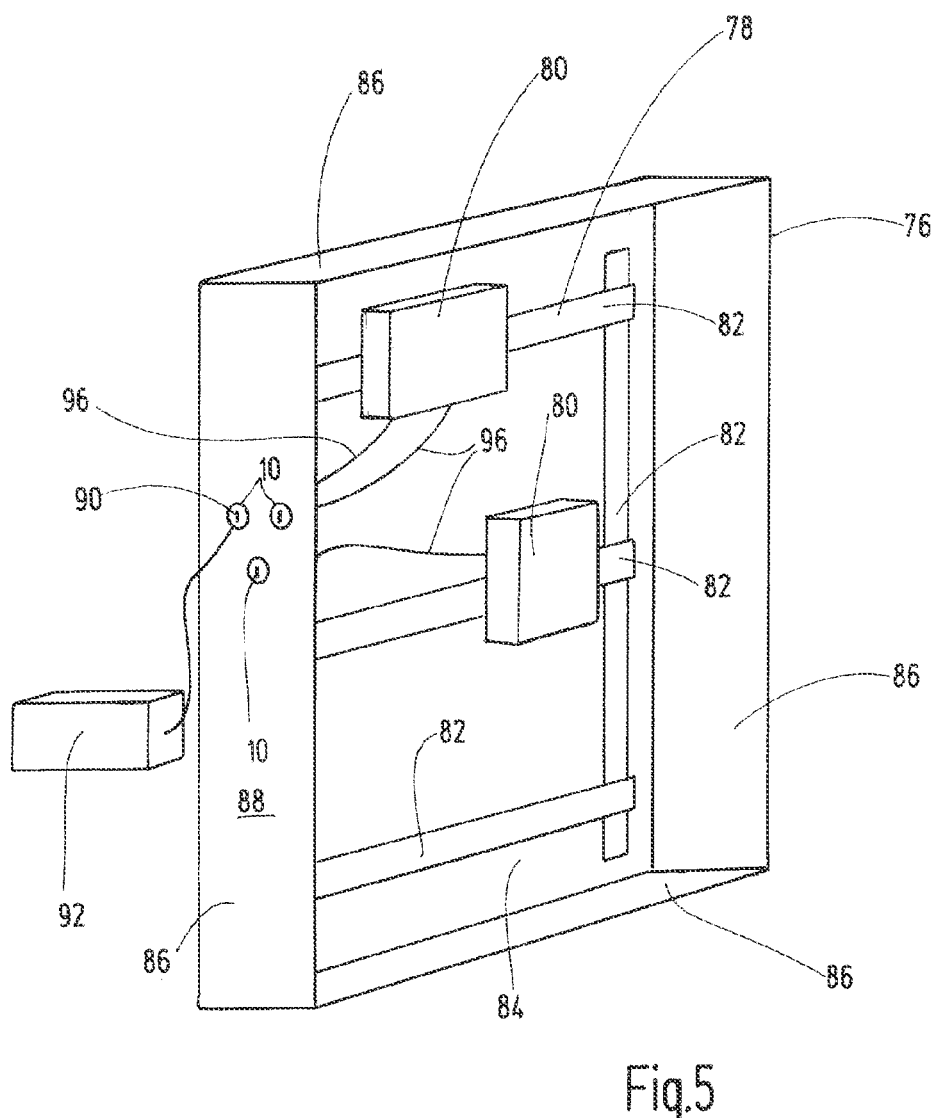
FIG. 5 is a perspective view of key components of an example control cabinet in the form of a box, in which, for the sake of simplicity, the front control cabinet walls have been omitted, and with a side wall with three receiving and securing devices with inserted keystone modules, an example external service and diagnostic device being connected to a corresponding system.

FIG. 5 then shows an application of the aforementioned system technology in connection with so-called control cabinets.

FIG. 5 shows a perspective view of a corresponding control box or control cabinet 76, as usually used for assembly of electrical control equipment, for example in industrial production technology. A device 78 for arranging and securing electrical units 80 is arranged in the control cabinet 76, wherein, in the illustrated embodiment, the device 78 comprises mounting rails 82 running horizontally and vertically on which the units 80 are arranged. The corresponding control cabinet design is only shown by way of example and is only reproduced in a very simplified manner in view of the complexity of the interior of a control cabinet 76.

Furthermore, the control cabinet 76 comprises the side walls 86 in addition to a rear wall 84, wherein the side wall 86, running vertically and arranged on the far left as viewed on FIG. 1, comprises, by way of example, the receiving and securing device shown in FIGS. 1 to 4 in addition to the inserted keystone modules 10. To this end, the side wall 86 is generally furnished with a penetration in the form of a hole 87, through which the receiving and securing device according to the teachings herein along with the keystone module 10 pass, and the wall parts 88 adjacent to these passage openings of the assigned side wall 86 are received in the clamping or securing gap 16 and secured as part of the advancing movement of one component 14 towards the first stationary component 12 such that the system is thus positioned in a defined manner on the side wall 86.

As is also shown on FIG. 1, the keystone module 10 comprises a socket 90 on its upper side, to which a plug-in part of a service and diagnostic device 92, which is not specified in greater detail, can be connected. In the underlying angled region 46 of the keystone module 10, a further connection socket option 90 can be provided, which leads by means of cabling 96 to the individual units 80 such as to thus make it possible to read off technically important data from the units 80 via the device 92 so that the functionality of the units 80 can be monitored as part of a service or diagnostic operation. Furthermore, by using the system as a computer interface, it is possible to connect various computers to the units 80 in order to carry out a software update or similar, for example.

The aforementioned keystone concept Is particularly suitable for mixed cabling which is intended to combine many different signal transmissions neatly onto one patch panel, as can be encountered in the wiring of a large number of applications. It also offers many benefits during assembly: for example, wires laid at a later date can easily be integrated by first connecting each new cable to the keystone module outside the network cabinet under good lighting and operating conditions. Afterwards, this is braided into the cable harness and the patch panel is latched into position. This prevents a patch panel, which can weigh up to 10 kg with 48 ports and if fully occupied, inadvertently working loose. This can even save so-called downtime in cases of doubt and prevent contamination of the rack cabinet due to cable sections. Finally, with conventional patch panels, it is not possible to replace individual damaged ports, unlike with the aforementioned keystone modules.

Even so called active components, such as USB charging devices in keystone format, for example, can be produced using the aforementioned solution according to the teachings herein. If the receiving and securing device according to the teachings herein has a cover part 54, the underlying components are protected from dust and fluids such as water, when the cover part 54 is closed. A virtually waterproof keystone can thus be created. Depending on the application, however, the cover part 54 can also be omitted, in particular need not be latched with the other parts of the keystone holder, which helps reduce costs. The receiving and securing device according to the teachings herein is based on the usual standards and in particular comprises a standardised rectangular receiving opening for the keystone with dimensions 14.9 mm×17 mm. The keystone modules that can be latched in this opening can also be assembled and dismantled without the need to handle additional tools. The conformity of modules and chassis is explained in greater detail in the aforementioned U.S. Pat. No. 5,624,274.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A receiving and securing device for keystone modules, comprising at least two components which are releasably connected to each other and which delimit a securing gap therebetween, of which the free gap space can be modified by an advancing movement of the second component towards the first component, and at least the first component, around which the second component engages, delimits a free opening space with a securing option for the latching engagement of a keystone module that can be inserted into the opening space; wherein the first component comprises a pivotable cover part, which, in the closed state, covers the opening space on the side of one subcomponent, and in the opened state, releases said opening space; and wherein the cover part comprises a security opening, which, in the closed state, can be aligned with a further security opening on the side of the first component to attach a security device, such as a seal.

2. The device of claim 1, wherein the free opening space of the first component is constructed from different subcomponents thereof, having a first subcomponent that, on its side facing the second component, has a contact surface as part of the securing gap, and having a second subcomponent that has a threaded area on its outer side.

3. The device of claim 2, wherein a third subcomponent is arranged between the first and the second subcomponent, said third component corresponding, in terms of its longitudinal extension, to the gap dimension of the securing gap.

4. The device of claim 2, wherein all subcomponents are an integral part of the first component.

5. The device of claim 2, wherein the threaded area of the second subcomponent is subdivided into one area part that is configured to have a closed circumference, said area part being adjacent to the contact surface of one subcomponent, and into a second adjoining area part that is configured with interruptions, and in that, in the region of each interruption, the opening space opens into the surrounding area.

6. The device of claim 5, wherein the interruptions of the second area part, formed as a diametrically opposite pair in relation to the longitudinal axis of the opening space, delimit a receiving space, which transitions into the opening space and serves to receive parts of the keystone module.

7. The device of claim 5, wherein in the region of the transition between the first and second area part, a securing plate runs transverse to the longitudinal axis of the opening space as a securing option.

8. The device of claim 6, wherein a cylindrical section of the opening space adjoins a rectangular opening cross-section of the securing plate in the direction of the threaded area and, on the opposite side, the opening space is extended in steps, in that a first step is in this case surrounded by a polygon and a second adjoining step consists of a frame with an enlarged cross-section in relation thereto, with arcuate corner regions, which forms part of the first component.

9. The device of claim 2, wherein the second component consists of an annular body, which is furnished with a thread on its inside, said thread allowing the second component to be screwed onto the threaded area of the first component, reducing the gap size of the securing gap.

10. The device of claim 9, wherein the annular body of the second component comprises engagement surfaces on its outer circumference for engaging an actuating tool.

11. A system comprising a device of claim 1 and a keystone module, which is standardised, at least in relation to its outer dimensions, for engaging in the opening space and in relation to the latching engagement on the securing option of the device, via at least one latching lug.

12. A control cabinet for receiving electrical and electronic components having at least one device of claim 1, wherein the device can be inserted in an insertion opening of an associated cabinet wall in an interchangeable manner such that the wall parts delimiting the insertion opening at least partially engage in the securing gap between the two components and are secured here in a clamping manner by means of the advancing movement.

13. A connection system for a control cabinet, comprising a device of claim 1 secured in an insertion opening of a cabinet wall, said device having a standardised keystone module, which, inserted in the free opening space of the first component via a securing option thereof, is latched, and in that the keystone module, at least partially released from the respective component, comprises a connection socket pointing to the surrounding area and wiring directed towards the inside of the control cabinet, which is connected to the electrical or electronic components of the control cabinet.

14. The device of claim 3, wherein the third component is thread-free.

15. The device of claim 2, wherein a third subcomponent is arranged between the first and the second subcomponent, said third component corresponding, in terms of its longitudinal extension, to the gap dimension of the securing gap.

16. The device of claim 2, wherein all subcomponents are an integral part of the first component.

* * * * *